United States Patent [19]

Drysdale

[11] Patent Number: 5,990,264
[45] Date of Patent: *Nov. 23, 1999

[54] COPOLYMERIZATION OF TETRAHYDROFURANS AND CYCLIC ANHYDRIDES

[75] Inventor: Neville Everton Drysdale, Newark, Del.

[73] Assignee: E. I. du Pont de Nemours and Company, Wilmington, Del.

[*] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/690,119

[22] Filed: Jul. 31, 1996

Related U.S. Application Data

[63] Continuation-in-part of application No. 08/505,293, Aug. 22, 1995, abandoned, application No. PCT/US93/10140, Oct. 29, 1993, and application No. 08/021,369, Feb. 23, 1993, abandoned.

[51] Int. Cl.$^6$ .............................. C08G 63/42; C07C 67/24
[52] U.S. Cl. ........................... 528/271; 528/365; 560/200
[58] Field of Search ................... 528/365, 271; 560/200

[56] References Cited

U.S. PATENT DOCUMENTS

| | | | |
|---|---|---|---|
| 3,464,958 | 9/1969 | Matsuura et al. | 260/78.4 |
| 3,842,019 | 10/1974 | Kropp | 528/410 |
| 3,864,287 | 2/1975 | Matsuda et al. | 528/409 |
| 5,084,586 | 1/1992 | Farooq | 556/181 |
| 5,130,470 | 7/1992 | Dorai et al. | 560/200 |
| 5,430,122 | 7/1995 | Drysdale | 528/55 |
| 5,475,069 | 12/1995 | Drysdale | 526/192 |
| 5,478,920 | 12/1995 | Drysdale | 528/410 |
| 5,541,346 | 7/1996 | Drysdale et al. | 549/509 |

FOREIGN PATENT DOCUMENTS

WO 88/02661   4/1988   WIPO ............................ B01J 31/26

OTHER PUBLICATIONS

Habermeier, J. et al, *J. Poly. Science: Part C*, 16, 2131–2141 (1967).

Borowsky, S. et al, *Organometallics*, 10, 1268–1274 (1991).

Hilt, V.A. et al, *Makromol. Chem.*, 101, 246–270 (1967).

Öechsner, W. et al, *Makromol. Chem.*, 150, 1–23 (1971).

Dreyfuss, P. et al, *Polymer Letters Ed.*, 14(3), 139–142 (1976).

Matsukura, K. et al, *Chemical Abstracts*, 78(16), p. 32 (1973).

*Primary Examiner*—Donald R. Wilson

[57] ABSTRACT

Poly(ester-ethers) are produced by the copolymerization of tetrahydrofurans and cyclic carboxylic anhydrides using selected metal perfluoroalkylsulfonates and related compounds as catalysts. The resulting copolymers are useful as intermediates for monomers for use in other polymerizations.

20 Claims, No Drawings

COPOLYMERIZATION OF TETRAHYDROFURANS AND CYCLIC ANHYDRIDES

CROSS-REFERENCE TO RELATED APPLICATIONS

This application is a continuation-in-part of application Ser. No. 08/505,293 filed Aug. 22, 1995, abandoned PCT/US 93/10140 filed Oct. 29, 1993; and application Ser. No. 08/021,369 filed Feb. 23, 1993, now abandoned.

FIELD OF THE INVENTION

This invention concerns a process for the copolymerization of tetrahydrofurans with cyclic carboxylic anhydrides to form a poly(ester-ether), wherein the polymerization is catalyzed by selected metal perfluoroalkylsulfonates.

BACKGROUND

Copolymers of tetrahydrofuran and cyclic anhydrides are known in the art. These polymers were made with the use of a Lewis acid catalyst such as an organoaluminum compound or an onium compound, optionally in the presence of a cocatalyst, see for example J. Habermeier, et al., J. Polym. Sci., Part C, p. 2131–2141 (1967). No mention is made in this paper of metal perfluoroalkylsulfonates as catalysts.

S. L. Borkowsky, et al., Organometal., vol. 10, p. 1268–1274 (1991) report that certain zirconium complexes can initiate the polymerization of tetrahydrofuran. No mention is made of zirconium perfluoroalkylsulfonates, or of copolymers.

U.S. Pat. No. 3,842,019 describes the polymerization of oxiranes and other small ring compounds by a presumed cationic mechanism, using as the catalyst the decomposition products of metal perfluoroalkyl sulfonates. These catalysts are described as "latent", that is no reaction occurs until the metal salt is decomposed. The reactions reported are relatively slow, even at elevated temperatures.

U.S. Pat. Nos. 5,084,586 and 5,124,417 describe the cationic polymerization of various monomers, including cyclic ethers, using onium cations, whose corresponding anions are fluororalkylsulfatometallates. Onium ion catalyzed cationic polymerizations are well known, and there is no mention in these patents of the use of metal salts not containing onium ions, such as metal triflates, as catalysts for the polymerization of cyclic ethers.

German Patent application 2,459,163 describes the polymerization of THF using a combination of ferric chloride and carboxylic anhydride as catalyst.

G. A. Olah, et al., J. Appl. Polym. Sci., Vol. 45, 1355–1360 (1992) describe the use of boron, aluminum and gallium tristriflate to catalyze the polymerization of THF.

SUMMARY OF THE INVENTION

This invention concerns a process for the production of a poly(ester-ether), comprising, contacting one or more cyclic carboxylic anhydrides, one or more tetrahydrofurans, and a catalyst of the formula $MZ_s.Qt$, wherein:

M is a metal selected from the group consisting of cobalt, vanadium, niobium, tungsten, strontium, barium, scandium, yttrium, the rare earth metals, titanium, zirconium, hafnium, chromium, molybdenum, tantalum, rhenium, iron, ruthenium, osmium, rhodium, iridium, palladium, platinum, silver, gold, zinc, cadmium, mercury, aluminum, gallium, indium, copper, mischmetall, thulium, germanium, tin, lead, arsenic, antimony and bismuth;

at least one of Z is an anion of the formula $-OSO_2R^5$, wherein $R^5$ is perfluoroalkyl containing 1 to 12 carbon atoms or part of a fluorinated polymer wherein the carbon atoms alpha and beta to the sulfonate group are together bonded to at least four fluorine atoms, or tetraphenylborate, and the remainder of Z is oxo or one or more monovalent anions;

s is 1 when M is silver;

s is 2 when M is strontium, barium, cobalt, copper, rhodium, iridium, palladium, platinum, chromium, zinc, cadmium or mercury;

s is 3 when M is scandium, yttrium, a rare earth metal, mischmetall, arsenic, antimony, bismuth, gold, iron, ruthenium, osmium, aluminum, gallium, indium or thulium;

s is 4 when M is titanium, zirconium, hafnium, molybdenum, germanium, tin, or lead;

s is 5 when M is rhenium, vanadium, niobium or tantalum;

s is 6 when M is tungsten;

Q is a neutral ligand;

t is 0 or an integer of 1 to 6; and provided that each oxo group present counts as two of s and that less than 1 mole of sulfuric acid per mole of $MZ_s.Qt$ is present.

DETAILS OF THE INVENTION

In the instant process a tetrahydrofuran is copolymerized with a cyclic anhydride to yield a poly(ether-ester). By a tetrahydrofuran (THF) is meant the common meaning, a compound containing a saturated five membered ring in which one of the ring atoms is oxygen and the other four ring atoms are carbon. Preferred tetrahydrofurans have the formula

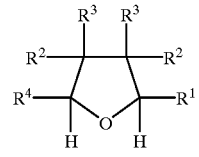

wherein each $R^1$, $R^2$, $R^3$ and $R^4$ is independently hydrogen or hydrocarbyl containing 1 to 20 carbon atoms. In especially preferred THFs, $R^1$, one of $R^2$ and all of $R^3$ and $R^4$ are hydrogen, and the remaining $R^2$ is alkyl containing 1–4 carbon atoms, particularly the remaining $R^2$ is methyl. In another especially preferred embodiment all of $R^1$, $R^2$, $R^3$ and $R^4$ are hydrogen.

By a cyclic carboxylic anhydride is meant the common meaning, a compound that can be represented by the formula

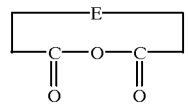

wherein E is a divalent organic radical which is bound to each valence of the carboxylic anhydride group through a carbon atom. In preferred embodiments, E is n-alkylene containing 1 to 4 carbon atoms or alkyl substituted n-alkylene wherein the n-alkylene group contains 1 to 4 carbon atoms, and E contains a total of 2 to 20 carbon atoms.

Specific useful cyclic carboxylic anhydrides include, but are not limited to, succinic, maleic, phthalic, 5-methyl-5-nobornenedicarboxylic acid and 1,2-cyclohexanedicarboxylic acid anhydrides. Preferred cyclic carboxylic anhydrides include maleic, succinic, phthalic and 1,2-cyclohexanedicarboxylic acid anhydrides.

In the above formula E may be substituted with one or more additional carboxylic anhydride groupings. For instance, 1,2,4,5-benzenetetracarboxylic dianhydride may be used in the process. It is believed that, depending on the concentration of the dianhydride, the resulting copolymer may be branched or even crosslinked (higher dianhydride levels).

It is believed that monovalent anions that are relatively nonnucleophilic are useful as Z. Examples of such anions are tetraphneylborate, $-OSO_2R^5$, wherein $R^5$ is perfluoroalkyl or wherein $R^5$ is part of a fluorinated polymer wherein the carbon atoms alpha and beta to the sulfonate group are together bonded to at least 4 fluorine atoms (as in $-CF_2CF_2O_2SO$). It is preferred if $R^5$ is perfluoroalkyl, and particularly preferred if $R^5$ is trifluoromethyl, so that $^-OSO_2R^5$ is trifluoromethanesulfonate, herein also called triflate.

The catalyst may be yttrium or rare earth compound of the formula $MZ_3$ where M is a trivalent ion of yttrium, or one of the rare earths, lanthanum, cerium, praeseodymium, neodymium, promethium, samarium, europium, gadolinium, terbium, dysprosium, holmium, erbium, thulium, ytterbium, and lutetium.

Preferred metals, M, are strontium, scandium yttrium, the rare earth metals, titanium, zirconium, hafnium, vanadium, niobium, tantalum, chromium, molybdenum, tungsten, rhenium, iron, ruthenium, palladium, copper, gold, zinc, tin and bismuth. More preferred metals are yttrium, the rare earth metals, and scandium. Especially preferred metals are yttrium, ytterbium, dysprosium, erbium, neodymium, lanthanum, and scandium. Another preferred metal is "mischmetall"(sometimes also called "didymium"), which is a mixture of rare earth metals as obtained from the ore.

Generally speaking, any metallic compound in which the correct metal in the correct oxidation state (see above) is present and bonded to a triflate or similar anion will be a catalyst. Such a compound must of course be reasonably stable during the polymerization, or decompose to another compound which is still a triflate (or similar anion) compound of the metal in the correct oxidation state. It has been found that, in general, the greater the number of triflate or similar groups bonded to the metal cation, the more active the metal compound will be as a catalyst. It is preferred if half or more of the anions (Z) bound to each metal cation is triflate or a similar anion.

The metal catalysts may optionally contain one or more neutral ligands coordinated to the metal. By a neutral ligand is meant a neutral compound that can coordinate with the catalysts, usually the metal cation. Neutral ligands include water, and ethers such as dimethyl ether and tetrahydrofuran. Useful compounds containing neutral ligands include bis(n-cyclopentadienyl)tetrahydrofuran-bis (trifluoromethanesulfonato)zirconium and bis(n-cyclopentadienyl)tetrahydrofuran bis (trifluoromethanesulfonato)hafnium.

The metals catalysts may contain other anions than triflate and similar anions, and tetrafluoroborate, although at least one of triflate or tetrafluoroborate anions must be present. Some other useful anions are alkoxide, particularly lower alkoxide containing 1–4 carbon atoms, acetylacetonate, cyclopentadieneide, pentamethylcyclopentadieneide, t-butylacetylacetonate, and halide. It is preferred if all of the anions are triflate.

It is believed that in the present process, the higher the ratio of metal catalyst compound to monomers, the lower the molecular weight of the resulting copolymer will be. It is also believed that the copolymer is a random copolymer, except that —O(O)CEC(O)— cannot be adjacent to itself. It is further believed that simple monomers such as THF and, say, succinic or maleic anhydrides, have about an equal propensity to polymerize into the copolymer.

The temperature at which the polymerization process is run is not critical, about −80° C. to about 110° C. being a convenient range, about 0° C. to about 110° C. is preferred, and about 25° C. to about 65° C. is especially preferred. At temperatures above the boiling point of the THF, a pressure vessel may be needed to contain that monomer.

In all of the polymerization processes herein, it is preferred that strong acids, and especially sulfuric acid, not be present in the polymerization or be present only in small amounts. By small amounts is meant that less than 1 mole, more preferably less than 0.75 mole, and especially preferred less than 0.5 mole of sulfuric acid per mole of $MZ_s.Q_t$ be present in these polymerization processes.

It is preferred to run the polymerization neat, that is in the absence of solvent. However, inert solvents such as ethyl ether or toluene may be present if desired. Mild agitation to keep the process ingredients well mixed is preferred. The polymerization is mildly exothermic and agitation also prevents "hot spots" from forming. If the process temperature increases appreciably, refluxing of a volatile monomer (or solvent) may be used to cool the process. The polymerization may take as long as a day, however, more common times are 1 to 2 hours. It is preferred to run the polymerization under dry (water free) conditions to avoid needless decomposition of the ingredients and/or products, and therefor the ingredients should also preferably be dry. It is convenient to use an inert atmosphere such as dry nitrogen. The polymer may be isolated by removing volatiles by evaporation, of if the polymer is insoluble, by filtration. In general, the catalyst may be removed from the copolymer by washing the copolymer with water. In many cases, the catalyst may be reused in the polymerization.

The molar ratio of the THF to cyclic carboxylic anhydride can be about 0.2 to about 60, preferably about 2 to about 15, and most preferably about 5.

The polymerization process may be carried out in a number of ways known to the artisan. It can be done by batch, semibatch and continuous processes. Continuous processes include continuous stirred tank reactor(s) and/or plug flow reactors.

The polymer produced by the instant process contains the repeat units —OCHR$^1$CR$^2$R$^3$CR$^2$R$^3$CHR$^4$— and —O(O)CEC(O)—, wherein the repeat units are randomly incorporated, except that —O(O)CEC(O)— cannot be adjacent to itself. The definitions of R$^1$, R$^2$, R$^3$, R$^4$ and E are as given above. The copolymers may be hydrogenated to a polytetrahydrofuran if succinic anhydride is used, or a mixed polyether if another anhydride is used. The copolymers, particularly those containing relatively small amounts of repeat units derived from cyclic carboxylic anhydrides, may also be completely hydrolyzed to polytetrahydrofuran. Such polyethers are useful (usually in their diol form) as monomers for condensation polymers such as polyesters or polyurethanes.

Synthesis of the catalysts used herein are demonstrated by Experiments 1–3 below.

EXPERIMENT 1

Preparation of Bis(n-cyclopentadienyl) tetrahydrofuran-bis(trifluoromethanesulfonato) hafnium In a dry box, hafnocene dichloride (9.93 g) was dissolved in THF (300 mL). To this solution, with stirring, was added a solution of silver triflate (14.12 g) in THF (100 mL). After 10 minutes the precipitated silver chloride was filtered off and the resulting filtrate concentrated to approximately half its volume at reduced pressure. Hexane (250 mL) was added and the resulting mixture placed in the freezer. The resulting precipitate was filtered and then dried under vacuum. Yield: 10.02 g. $^1$H NMR (CDCl$_3$): 6.68 (s, 10 H), 3.76 (m, 4H), 1.84 (m, 4H).

EXPERIMENT 2

Preparation of Bis(pentamethyl-n-cyclopentadienyl) bis(trifluoromethanesulfonato)zirconium In a dry box, bis(pentamethylcyclopentadienyl)zirconium dichloride (10.00 g) was dissolved in THF (300 mL). To this solution, with stirring, was added a solution of silver triflate (12.46 g) in THF (100 mL). After 15 minutes the precipitated silver chloride was filtered off and the resulting filtrate concentrated to approximately half its volume at reduced pressure. Hexane (250 mL) was added and the resulting mixture placed in the freezer. The resulting yellow precipitate was filtered and then dried under vacuum. Yield: 6.02 g. $^1$H NMR (CDCl$_3$): 2.12 (s).

EXPERIMENT 3

Preparation of Bis(n-cyclopentadienyl) bis(trifluoromethanesulfonato)vanadium In a dry box, vanadocene dichloride (5.00 g) was dissolved in THF (300 mL). To this solution, with stirring, was added a solution of silver triflate (11.19 g) in THF (100 mL). After 15 minutes the precipitated silver chloride was filtered off and the resulting filtrate concentrated to approximately half its volume at reduced pressure. Hexane (250 mL) was added and the resulting mixture placed in the freezer. The resulting green precipitate was filtered and then dried under vacuum. Yield: 6.99 g.

In the Examples, the following abbreviations are used:
GPC—gel permeation chromatography
Mn—number average molecular weight
PD—polydispersity, Mw/Mn
PS—polystyrene
RB—round-bottomed
THF—the compound tetrahydrofuran

EXAMPLE 1

Yttrium Triflate Catalyzed Copolymerization of Maleic Anhydride and THF

In a dry box, yttrium triflate (1.00 g) and maleic anhydride (2.00 g) were weighed in an oven dried 100 mL RB flask equipped with a stirring bar. The flask was sealed with a rubber septum and removed from the dry box and a nitrogen bleed attached. THF (20 mL) was added via syringe. After 2 hrs. the polymerization was terminated via the addition of water (25 mL) and THF (50 mL), the organic phase was separated, concentrated at reduced pressure and dried under vacuum. Polymer yield: 3.38 g. GPC analysis: Mn=96800, Mw=188000, PD=1.95 (PS STD.). $^1$H NMR analysis indicates the THF to anhydride ratio to be ~15.

EXAMPLE 2

Yttrium Triflate Catalyzed Copolymerization of Succinic Anhydride and THF

In a dry box, yttrium triflate (1.00 g) and succinic anhydride (2.00 g) were weighed in an oven dried 100 mL RB flask equipped with a stirring bar. After sealing with a rubber septum the flask was removed from the dry box and a nitrogen bleed attached. THF (20 mL) was added via syringe. After 2 hrs. the polymerization was terminated via the addition of water (25 mL) and THF (50 mL). The resulting organic phase was separated, concentrated at reduced pressure and dried under vacuum. Polymer yield: 5.00 g. GPC analysis: Mn=80900, Mw=171000, PD=2.12 (PS STD.). $^1$H NMR analysis indicates the THF to anhydride ratio to be ~4.5.

EXAMPLE 3

Yttrium Triflate Catalyzed Copolymerization of Maleic Anhydride and THF at 40° C.

In a dry box, yttrium triflate (1.00 g) and maleic anhydride (3.00 g) were weighed in an oven dried 100 mL RB flask equipped with a stirring bar. After sealing with a rubber septum, the flask was removed from the dry box and a nitrogen bleed attached, the flask was then placed in an oil bath maintained at 40° C. THF (20 mL) was then added via syringe. After 2 hrs. the polymerization was terminated via the addition of water (25 mL), THF (50 mL) and diethyl ether (25 mL) the resulting organic phase was separated, concentrated at reduced pressure and dried under vacuum. Polymer yield: 6.16 g. GPC analysis: Mn=34800, Mw=74100, PD=2.13 (PS STD.).

EXAMPLE 4

Yttrium Triflate Catalyzed Copolymerization of Phthalic Anhydride and THF at 40° C.

In a dry box, yttrium triflate (1.00 g) and phthalic anhydride (3.00 g) were weighed in an oven dried 100 mL RB flask equipped with a stirring bar. The flask was sealed with a rubber septum and removed from the dry box. A nitrogen purge was attached and the flask placed in an oil bath maintained at 40° C. THF (20 mL) was immediately added and the resulting solution stirred at this temperature for 2 hrs. The polymerization was terminated by the addition of water (25 mL) and THF (50 mL), the resulting organic phase was separated, concentrated at reduced pressure and then dried under vacuum. Polymer yield: 7.04 g. GPC analysis: Mn=69400, Mw=128000, PD=1.85 (PS STD.). $^1$H NMR analysis indicates the THF to anhydride ratio to be ~3.6.

EXAMPLE 5

Ytterbium Triflate Catalyzed Copolymerization of Cis-1,2-Cyclohexane-Dicarboxylic Anhydride and THF at 40° C.

In a dry box, ytterbium triflate (1.00 g) and cis-1,2-cyclohexanedicarboxylic anhydride (1.5 g) were weighed in an oven dried 100 mL RB flask equipped with a stirring bar. The flask was sealed with a rubber septum and removed from the dry box. A nitrogen purge was attached and the flask placed in an oil bath maintained at 40° C. THF (20 mL) was immediately added and the resulting solution stirred at this temperature for 60 min. The polymerization was terminated by the addition of water (25 mL) and THF (50 mL), the resulting organic phase was separated, concentrated at reduced pressure and then dried under vacuum. Polymer yield: 9.26 g. GPC analysis: Mn=38100, Mw=83500, PD=2.15 (PS STD.).

EXAMPLE 6

Yttrium Triflate Catalyzed Copolymerization of Norbornene-2,3-dicarboxylic Anhydride and THF at 40° C.

In a dry box, yttrium triflate (1.00 g) and norbornene-2, 3-dicarboxylic anhydride (4.0 g, 96%) were weighed in an oven dried 100 mL RB flask equipped with a stirring bar. The flask was sealed with a rubber septum and removed from the dry box. After the attachment of a nitrogen purge THF (20 mL) was added and the resulting solution stirred at room temperature for 60 min. The polymerization was terminated by the addition of water (25 mL) and THF (50 mL), the resulting organic phase was separated, concentrated at reduced pressure and then dried under vacuum. Polymer yield: 5.13 g. GPC analysis: Mn=52400, Mw=111000, PD=2.13 (PS STD.).

EXAMPLE 7

Erbium Triflate Catalyzed Copolymerization of Cis-1,2-Cyclohexane-Dicarboxylic Anhydride and THF In a dry box, erbium triflate (1.00 g) and cis-1,2-cyclohexane-dicarboxylic anhydride (1.5 g) were weighed in an oven dried 100 mL RB flask equipped with a stirring bar. The flask was sealed with a rubber septum and removed from the dry box. A nitrogen purge was attached, THF (20 mL) was immediately added and the resulting solution stirred at room temperature for 120 min. The polymerization was terminated by the addition of water (25 mL) and THF (50 mL), the resulting organic phase was separated, concentrated at reduced pressure and then dried under vacuum. Polymer yield: 3.03 g.

EXAMPLE 8

Neodymium Triflate Catalyzed Copolymerization of Cis-1,2-Cyclohexanedicarboxylic Anhydride and THF In a dry box, neodymium triflate (1.00 g) and cis-1,2-cyclohexanedicarboxylic anhydride (1.5 g) were weighed in an oven dried 100 mL RB flask equipped with a stirring bar. The flask was sealed with a rubber septum and removed from the dry box. A nitrogen purge was attached, THF (20 mL) was immediately added and the resulting solution stirred at room temperature for 120 min. The polymerization was terminated by the addition of water (25 mL) and THF (50 mL), the resulting organic phase was separated, concentrated at reduced pressure and then dried under vacuum. Polymer yield: 1.39 g.

EXAMPLE 9

Dysprosium Triflate Catalyzed Copolymerization of Cis-1,2-Cyclohexanedicarboxylic Anhydride and THF In a dry box, dysprosium triflate (1.00 g) and cis-1,2-cyclohexanedicarboxylic anhydride (1.5 g) were weighed in an oven dried 100 mL RB flask equipped with a stirring bar. The flask was sealed with a rubber septum and removed from the dry box. A nitrogen purge was attached, THF (20 mL) was immediately added and the resulting solution stirred at room temperature for 120 min. The polymerization was terminated by the addition of water (25 mL) and THF (50 mL), the resulting organic phase was separated, concentrated at reduced pressure and then dried under vacuum. Polymer yield: 1.96 g.

EXAMPLE 10

Scandium Triflate Catalyzed Copolymerization of Cis-1,2-Cyclohexanedicarboxylic Anhydride and THF In a dry box, scandium triflate (1.00 g) and cis-1,2-cyclohexanedicarboxylic anhydride (1.5 g) were weighed in an oven dried 100 mL RB flask equipped with a stirring bar. The flask was sealed with a rubber septum and removed from the dry box. A nitrogen purge was attached, THF (20 mL) was immediately added and the resulting solution stirred at room temperature for 120 min. The polymerization was terminated by the addition of water (25 mL) and THF (50 mL), the resulting organic phase was separated, concentrated at reduced pressure and then dried under vacuum. Polymer yield: 1.30 g.

EXAMPLE 11

Ytterbium Triflate Catalyzed Copolymerization of Succinic Anhydride, THF and 3-Methyl-THF In a dry box, ytterbium triflate (2.00 g) and succinic anhydride (2.00 g) were weighed in an oven dried 100 mL RB flask equipped with a stirring bar. After sealing with a rubber septum the flask was removed from the dry box and a nitrogen bleed attached. THF (15.00 mL) and 3-methyl-THF (5.00 mL) were added via syringe. After 2 hrs the polymerization was terminated via the addition of water (25 mL) and THF (50 mL) and ether (25 mL). The resulting organic phase was separated, concentrated at reduced pressure and dried under vacuum. Polymer yield: 4.32 g. GPC analysis (PS STD.): Mn=26100, Mw=43100, PD=1.65.

EXAMPLE 12

Ytterbium Triflate Catalyzed Copolymerization of Succinic Anhydride, THF and 3-Methyl-THF In a dry box, ytterbium triflate (2.00 g) and succinic anhydride (3.00 g) were weighed in an oven dried 100 mL RB flask equipped with a stirring bar. After sealing with a rubber septum the flask was removed from the dry box and a nitrogen bleed attached. THF (15.00 mL) and 3-methyl-THF (5.00 mL) were added via syringe. After 2 hrs the polymerization was terminated via the addition of water (25 mL) and THF (50 mL) and ether (25 mL). The resulting organic phase was separated, concentrated at reduced pressure and dried under vacuum. Polymer yield: 7.27 g. GPC Analysis (PS STD.): Mn=30600, Mw=52400, PD=1.71.

EXAMPLE 13

Zirconium Triflate Catalyzed Copolymerization of 1,2,4,5-Benzenetetracarboxylic Dianhydride and THF In a dry box, zirconium triflate (2.00 g) and 1,2,4,5-benzenetetracarboxylic dianhydride (4.00 g) were weighed in an oven dried 100 mL RB flask equipped with a stirring bar. After sealing with a rubber septum the flask was removed from the dry box and a nitrogen bleed attached. THF (20.00 mL) was added via syringe. After 2 hrs the polymerization was terminated via the addition of water (25 mL). The resulting slurry was concentrated at reduced pressure, resulting in a thick viscous material. This material was washed repeatedly with water and then dried under vacuum. Polymer yield: 7.12 g.

EXAMPLE 14

Bis n-cyclopentadienyl)tetrahydrofuran bis (trifluoromethanesulfonato)zirconium Catalyzed Copolymerization of Maleic Anhydride and THF In a dry box, bis(n-cyclopentadienyl)tetrahydrofuran-bis (trifluoromethanesulfonato)zirconium (0.50 g) and maleic anhydride (1.00 g) were added an oven dried 100 mL RB flask equipped with a stirring bar. The flask was sealed with a rubber septum and removed from the dry box. After the attachment of a nitrogen bleed THF (10 mL) was added to the flask. After 75 min. the polymerization was terminated via the addition of water (25 mL), THF (50 mL) and ether (25 mL). The resulting organic phase was separated, concentrated at reduced pressure and then dried under vacuum. Polymer yield: 0.73 g. GPC analysis (PS STD.): Mn=56500, Mw=71600, PD=1.27.

EXAMPLE 15

Tin Triflate Catalyzed Copolymerization of Cis-1,2-CyclohexaneDicarboxylic Anhydride and THF In a dry box, tin triflate (1.00 g) and cis-1,2-cyclohexanedicarboxylic anhydride (1.5 g) were weighed in an oven dried 100 mL RB flask equipped with a stirring bar. The flask was sealed with a rubber septum and removed from the dry box. A nitrogen purge was attached, THF (20 mL) was immediately added and the resulting solution stirred at room temperature for 120 min. The polymerization was terminated by the addition of water (25 mL) and THF (50 mL), the resulting organic phase was separated, concentrated at reduced pressure and then dried under vacuum. Polymer yield: 1.41 g.

What is claimed is:

1. A process for the production of a poly(ester-ether), comprising, contacting at a temperature of −80° C. to 110° C., one or more cyclic carboxylic anhydrides, one or more tetrahydrofurans, and a catalyst of the formula $MZ_s \cdot Q_t$ wherein:

M is a metal selected from the group consisting of cobalt, vanadium, niobium, tungsten, strontium, barium, scandium, yttrium, the rare earth metals, titanium, zirconium, hafnium, chromium, molybdenum, tantalum, rhenium, iron, ruthenium, osmium, rhodium, iridium, palladium, platinum, silver, gold, copper, mischmetall, zinc, cadmium, mercury, indium, thulium, germanium, tin, lead, arsenic, antimony and bismuth;

at least one of Z is an anion of the formula $^-OSO_2R^5$, wherein $R^5$ is perfluoroalkyl containing 1 to 12 carbon atoms or part of a fluorinated polymer wherein the carbon atoms alpha and beta to the sulfonate group are together bonded to at least four fluorine atoms, or tetraphenylborate, and the remainder of Z is oxo or one or more monovalent anions;

s is 1 when M is silver;

s is 2 when M is strontium, barium, cobalt, copper, rhodium, iridium, palladium, platinum, chromium, zinc, cadmium or mercury;

s is 3 when M is scandium, yttrium, a rare earth metal, mischmetall, arsenic, antimony, bismuth, gold, iron, ruthenium, osmium, indium or thulium;

s is 4 when M is titanium, zirconium, hafnium, molybdenum, germanium, tin, or lead;

s is 5 when M is rhenium, vanadium, niobium or tantalum;

s is 6 when M is tungsten;

Q is a neutral ligand;

t is 0 or an integer of 1 to 6; and provided that each oxo group present counts as two of s and that less than 1 mole of sulfuric acid per mole of $MZ_s \cdot Q_t$ is present and further provided that said poly(ester-ether) has a molar ratio of said tetrahydrofurans to said cyclic carboxylic anhydrides of about 3.6 to about 15.

2. The process as recited in claim 1 wherein said tetrahydrofuran has the formula

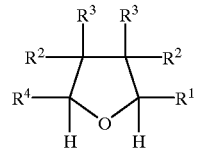

wherein each $R^1$, $R^2$, $R^3$ and $R^4$ is independently hydrogen or hydrocarbyl containing 1 to 20 carbon atoms.

3. The process as recited in claim 2 wherein $R^1$, one of $R^2$, and all of $R^3$, and $R^4$ are hydrogen, and the remaining $R^2$ is alkyl containing 1 to 4 carbon atoms.

4. The process as recited in claim 3 wherein said remaining $R^2$ is methyl.

5. The process as recited in claim 2 wherein all of $R^1$, $R^2$, $R^3$ and $R^4$ are hydrogen.

6. The process as recited in claim 1 wherein said carboxylic anhydride has the formula

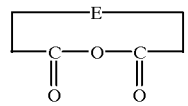

wherein E is a divalent organic radical which is bound to each free valence of the carboxylic anhydride group through a carbon atom.

7. The process as recited in claim 2 wherein said carboxylic anhydride has the formula

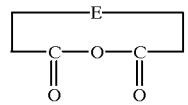

wherein E is a divalent organic radical which is bound to each free valence of the carboxylic anhydride group through a carbon atom.

8. The process as recited in claim 6 wherein E is n-alkylene containing 1 to 4 carbon atoms or alkyl substituted n-alkylene wherein said n-alkylene group contains 1 to 4 carbon atoms and E contains a total of 2 to 20 carbon atoms.

9. The process as recited in claim 1 wherein said anhydride is selected from the group consisting of succinic, maleic, phthalic, 5-methyl-5-nobornenedicarboxylic acid and 1,2-cyclohexanedicarboxylic acid anhydrides.

10. The process as recited in claim 1 wherein said anhydride is selected from the group consisting of maleic, succinic, phthalic and 1,2-cyclohexanedicarboxylic acid anhydrides.

11. The process as recited in claim 2 wherein M is a metal selected from the group consisting of strontium, barium, scandium, yttrium, the rare earth metals, titanium, zirconium, hafnium, chromium, molybdenum, tantalum, rhenium, iron, ruthenium, osmium, rhodium, iridium, palladium, platinum, silver, gold, zinc, cadmium, mercury, germanium, tin, lead, arsenic, antimony and bismuth.

12. The process as recited in claim 1 wherein all of Z is an anion of the formula $^-OSO_2R^5$, and wherein $R^5$ is trifluoromethyl.

13. The process as recited in claim 1 wherein said temperature is about 0° C. to about 110° C.

14. The process as recited in claim 1 wherein said temperature is about 25° C. to about 65° C.

15. The process as recited in claim 1 carried out in the absence of solvent.

16. The process as recited in claim 1 wherein the molar ratio of said tetrahydrofuran to said anhydride is about 0.2 to about 60.

17. The process as recited in claim 16 wherein said ratio is about 2 to about 15.

18. The process as recited in claim 17 wherein said ratio is about 5.

19. The process as recited in claim 5 wherein M is strontium, scandium, yttrium, the rare earth metals, titanium, zirconium, hafnium, vanadium, niobium, tantalum, chromium, molybdenum, tungsten, rhenium, iron, ruthenium, palladium, copper, gold, zinc, tin, bismuth or mischmetall.

20. The process as recited in claim 1 wherein less than 0.5 moles of sulfuric acid per mole of $MZ_s.Q_t$ is present.

* * * * *